United States Patent [19]

Moore

[11] Patent Number: 5,248,159
[45] Date of Patent: Sep. 28, 1993

[54] LIGHTWEIGHT SELF-ADJUSTING SEMIHYDRAULIC SUSPENSION SYSTEM

[76] Inventor: James D. Moore, 1823 Border Ave., Torrance, Calif. 90501

[21] Appl. No.: 837,045

[22] Filed: Feb. 18, 1992

[51] Int. Cl.$^5$ .............................................. B62K 21/02
[52] U.S. Cl. ..................................... 280/276; 267/33; 267/202
[58] Field of Search .............. 280/276, 279, 280, 691; 188/129; 267/33, 34, 70, 167, 180, 202

[56] References Cited

U.S. PATENT DOCUMENTS

| | | | |
|---|---|---|---|
| 3,083,038 | 3/1963 | Moulton | 280/276 |
| 3,984,119 | 10/1976 | Okazima | 280/276 |
| 5,163,697 | 11/1992 | Kastan | 280/276 |

OTHER PUBLICATIONS

Delta V by Cannondale ® in *Mountain & City Biking*, vol. 6 No. 2, Feb. 1992, pp. 4 & 5.
Future Shock Fork, by Joe Murray Mountain Bike Components*Mountain & City Biking*, vol. 6 No. 2, Feb. 1992 p. 20.
"Answer's Monitor Suspension Fork", *Mountain & City Biking* vol. 6 vol. 2, Feb. 1992 pp. 51-54.
"1992 Rock Shox", *Mountain Bike Action*, Oct. 1991, pp. 47-54.
Action Tec in *Mountain Bike Action*, Oct. 1991, p. 153.

*Primary Examiner*—David M. Mitchell
*Assistant Examiner*—Andrew C. Pike
*Attorney, Agent, or Firm*—Lee W. Tower

[57] ABSTRACT

A bicycle shock absorber system employs a rubber sleeve trapped between two bushings which are spring loaded so as to increase the force on the rubber sleeve as spring force increases with travel. The rubber sleeve and bushings move with the fork stem which is rigidly attached to the fork and wheel and which slide inside an oil coated steerer tube which in turn rotates inside the outermost head tube which is integral with the bicycle frame. Upper and lower drive flexures permit relative sliding motion but rigidly prevent relative rotary motion so that steering forces are rigidly transferred into the fork stem. The internal elements operate in a bath of heavy oil which coats all the sliding elements providing complete lubrication and the viscous "feel" of a hydraulic shock absorber. Any combination of spring and damping rates may be achieved by changing springs and the oil viscosity. The system is designed to be small and compact enough to fit in a common "oversize" bicycle headtube. The design is easily adapted to make use of an air spring by adding a small sealed piston and air charging valve.

12 Claims, 5 Drawing Sheets

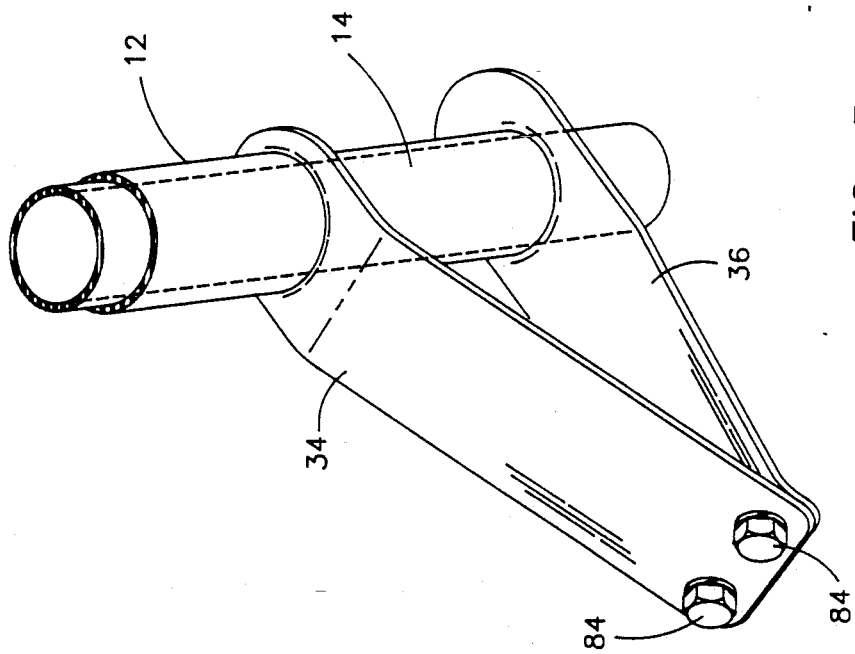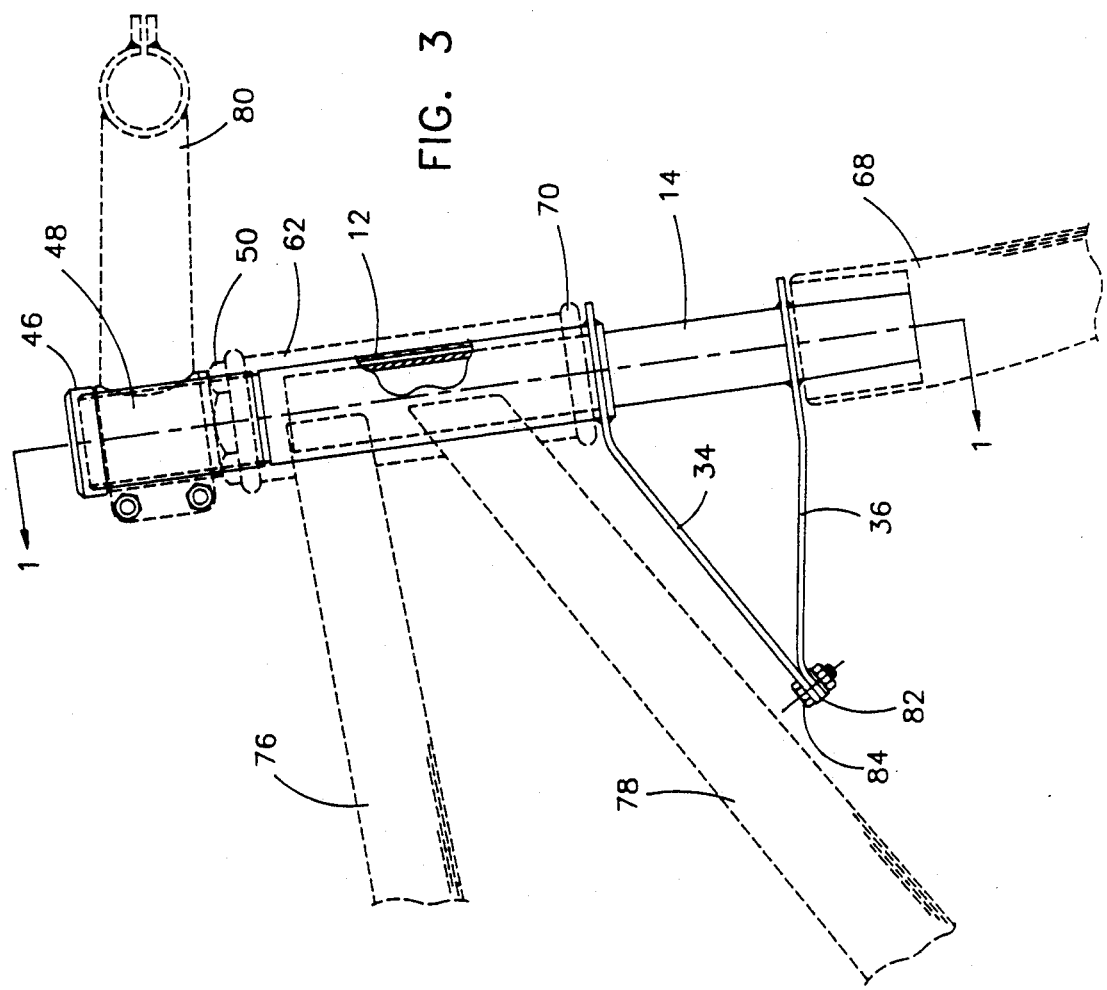

LIGHTWEIGHT SELF-ADJUSTING SEMIHYDRAULIC SUSPENSION SYSTEM

BACKGROUND OF THE INVENTION

1. Field of the Invention

This invention relates to bicycle suspension systems, particularly to a lightweight highly responsive off-road racing bicycle front wheel suspension system, although the invention is adaptable to rear suspension and to paved road racing bicycles.

2. Prior Art

Racing bicycle suspension systems require a combination of construction features which place a high priority on low weight, rigidity, responsiveness, and producibility. In today's bicycle racing environment, a few ounces of additional weight, a small amount of "play" in the system, and/or a lack of responsiveness to various terrains means the difference between winning or losing a race. A superior athlete can generate less than one horsepower and this small amount of power must be wisely used. Since the addition of suspension adds weight to the bicycle, the ability of the suspension to give the rider increased control in high speed downhill maneuvers must more than compensate for the weight increase which slows uphill pedaling. Thus weight considerations and responsiveness must be perfectly balanced. Ideally, a bicycle suspension system would also instantaneously adjust itself to the widely varying terrain encountered in "mountain bike" racing, and the spring and damping rates would increase with wheel travel.

In prior art inventions, especially those which draw upon dual shock motorcycle technology, one problem is solved while another is created. Systems which tend to give best damping control tend to be heavy, such as a dual shock absorber system using common coilspring/hydraulic viscous damping. Such dual fork shock absorber systems work well on dirt track motorcycles where power to weight ratios are much greater than on bicycles. Lighter weight is achieved in dual fork systems, such as one marketed by Answer Racing Products of Valencia, Calif. called the "Manitou" by utilizing viscoelastic materials that serve as springs and provide some damping due to friction between the molecules of the material; however, these materials tend to break down in a relatively short time. Also, dual fork shock absorber systems have the disadvantage of having to be synchronized to work together in order to prevent brake rub. Steering rigidity tends to be low because the wheel axle provides the only resistance to twisting moments induced in the shock tubes by steering forces. In a mono-shock absorber system, rigidity problems and weight are reduced by enclosing a viscous damping system in the bicycle head tube and using compressed air as the spring such as in the "Delta V" shock absorber made by Cannondale Corporation of Bedford, Pa. The latter system is an improvement, but is not instantaneously self adjusting in that the spring and damping rate do not vary with wheel travel. Further, although an air spring is the lightest means of providing spring force, the air spring must always have a relatively large initial pressure and is subject to leakage. There is a monoshock absorber system utilizing steel springs made by ACTION-TEC Company of Silverado, Calif., but it is relatively heavy and not self adjusting.

SUMMARY OF THE INVENTION

The object of the present invention is a lightweight self-adjusting semihydraulic suspension system which optimally meets the aforementioned weight, responsiveness, reliability, and rigidity requirements while being producible at low cost and being attractive in appearance.

The invention is a "monoshock" system which employs a rubber sleeve trapped between two bushings which are spring loaded so as to increase the compression of the rubber sleeve and thereby the damping as spring force increases thereby providing the self adjusting feature. The rubber sleeve and bushings move with the internal stem tube which is rigidly attached to the fork and wheel and which slide inside an oil coated steerer tube which in turn rotates inside the outermost head tube which is integral with the bicycle frame. Welded to the stem and steerer tube are upper and lower drive flexures which permit relative sliding motion but which rigidly prevent relative rotary motion so that steering forces are rigidly transferred from the handle bars through the handle bar stem into the steerer tube through the drive flexures and into the fork stem. The invention has welded or tightly bolted connections in this drive path so "play" is virtually eliminated, in contrast to having slip fitted hinge pins. The internal elements operate in a bath of heavy oil which coats all the sliding elements providing complete lubrication and the viscous "feel" of a hydraulic shock absorber. Using concentric springs of various lengths and stiffness pushing upon the bushings and rubber sleeve or by using a single spring wound so as to provide variable pitch and spring rate pushing upon the bushings and rubber sleeve, the force on the trapped rubber sleeve varies, thus varying the damping rate with the spring rate. Any combination of spring and damping rates may be achieved by changing springs and oil viscosity. The system instantly self adjusts to road conditions, including relatively small continuous "washboard" road conditions, potholes, curbsized obstructions, and the like which would otherwise slow the pace of a bicycle race.

The system is designed to be small and compact enough to fit in a common "oversize" bicycle headtube and bearing races. The design is easily adapted to make use of an air spring by adding a small sealed piston and air charging valve. A graphite or other composite tube can be pressed into the fork stem to increase rigidity dramatically without increasing size or materially increasing weight. Any of the embodiments may be sturdily and easily constructed using readily available aerospace materials such as alloys of steel, titanium, stainless steel, aluminum, magnesium, and the like, in addition to composites and engineering plastics.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 3 is a side elevational view of a front portion of a bicycle showing the location of the lightweight self adjusting semihydraulic suspension system according to the present invention within the bicycle head tube and showing the drive flexures connecting the tubular fork stem and the steerer tube.

FIG. 3a is a perspective view of the drive flexures connecting the tubular fork stem and the steerer tube.

DESCRIPTION OF THE PREFERRED EMBODIMENTS

Figure 1:
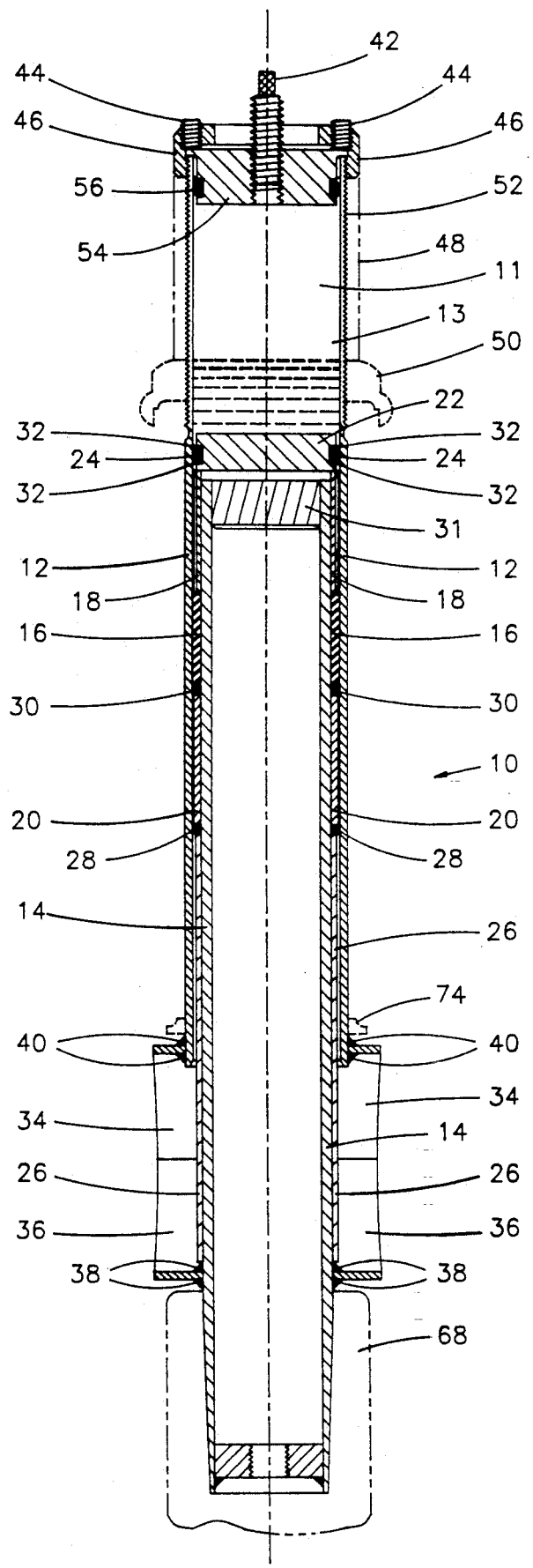
FIG. 1 is a sectional view along line 1—1 of FIG. 3 of a lightweight self-adjusting semihydraulic suspension system according to the present invention, having an air spring.

Referring now to the drawings, and more particularly, to FIG. 1, there is shown an apparatus for a lightweight self-adjusting semihydraulic suspension system 10, which is mounted inside handlebar stem 48 and the head tube 62, as shown in FIG. 3. FIG. 1 shows a compressed air spring system formed by piston 22 having seal 24, air chamber 11 partially filled with heavy oil 13, the upper end of steerer tube 12, and plug 54 having seal 56. The seal 24 has on each side a backup ring 32 to maintain the seal 24 in place on piston 22. As the piston operates most of the oil 13 stays inside air chamber 11 and provides a viscous feel of a hydraulic shock absorber because of the oil 13 in the air chamber 11 itself; however, a small amount of the oil 13 leaks around seal 24 and lubricates a bushing on the steerer tube 12 and a rubber sleeve, as explained below.

Inside the steerer tube 12 is tubular fork stem 14, which is attached to fork 68. Between the steerer tube 12 and the tubular fork stem 14 are a number of concentric elements that provide both a bearing structure between steerer tube 12 and tubular fork stem 14 and also a viscous damping mechanism. The top of the tubular fork stem 14 has a plug 31, Which prevents oil from entering the tubular fork stem 14. Proceeding from the top, the first concentric element between steerer tube 12 and tubular fork stem 14 is upper grooved bushing 18, which provides a bearing between steerer tube 12 and tubular fork stem 14. Next, rubber sleeve 16 is placed just below upper grooved bushing 18. Below rubber sleeve 16 is seal 30. The oil 13 that leaks past seal 24 lubricates both upper grooved bushing 18 and rubber sleeve 16 and then is prevented from proceeding further along between steerer tube 12 and tubular fork stem 14 by seal 30. Below seal 30 is lower bushing 20, which also provides a bearing between steerer tube 12 and tubular fork stem 14. Dirt wiper 28 is provided to prevent dirt from getting into the bushings or the rubber sleeve. Next, between steerer tube 12 and tubular fork stem 14 is spacer 26, which is not a bearing structure. As shown in FIG. 1, spacer 26 extends below the end of steerer tube 12 along side of tubular fork stem 14 until the point at which tubular fork stem 14 is welded at weld 38 to lower drive flexure 36. The tubular fork stem 14 is pressed into fork 68 to which the front wheel is coupled.

The steerer tube 12 is attached at the top to handlebar stem 48, which is clamped around thread 52 and capped by threaded cap 46, which has lock screws 44. At the bottom, steerer tube 12 is welded at weld 40 to upper drive flexure 34. The upper drive flexure 34 and the lower drive flexure 36 are connected together and provide both a connection and a spring action between steerer tube 12 and tubular fork stem 14. When the bicycle wheel hits a bump, the fork and thereby the tubular fork stem 14 is forced upward. The lower drive flexure 36 forces the spacer 26 upward which in turn forces lower bushing 20, rubber sleeve 16, upper grooved bushing 18 and finally piston 22 upward, which compresses the air in air chamber 11 thereby absorbing the shock. The air pressure inside of air chamber 11 can be adjusted by inserting or releasing air via air filler valve 42. In addition, rubber sleeve 16 is compressed between upper grooved bushing 18 and lower bushing 20 thereby providing damping as the rubber sleeve 16 expands between steerer tube 12 and tubular fork stem 14. The amount of compression and damping is self adjusting and depends on the amount of fork stem travel caused by a shock.

Figure 2:
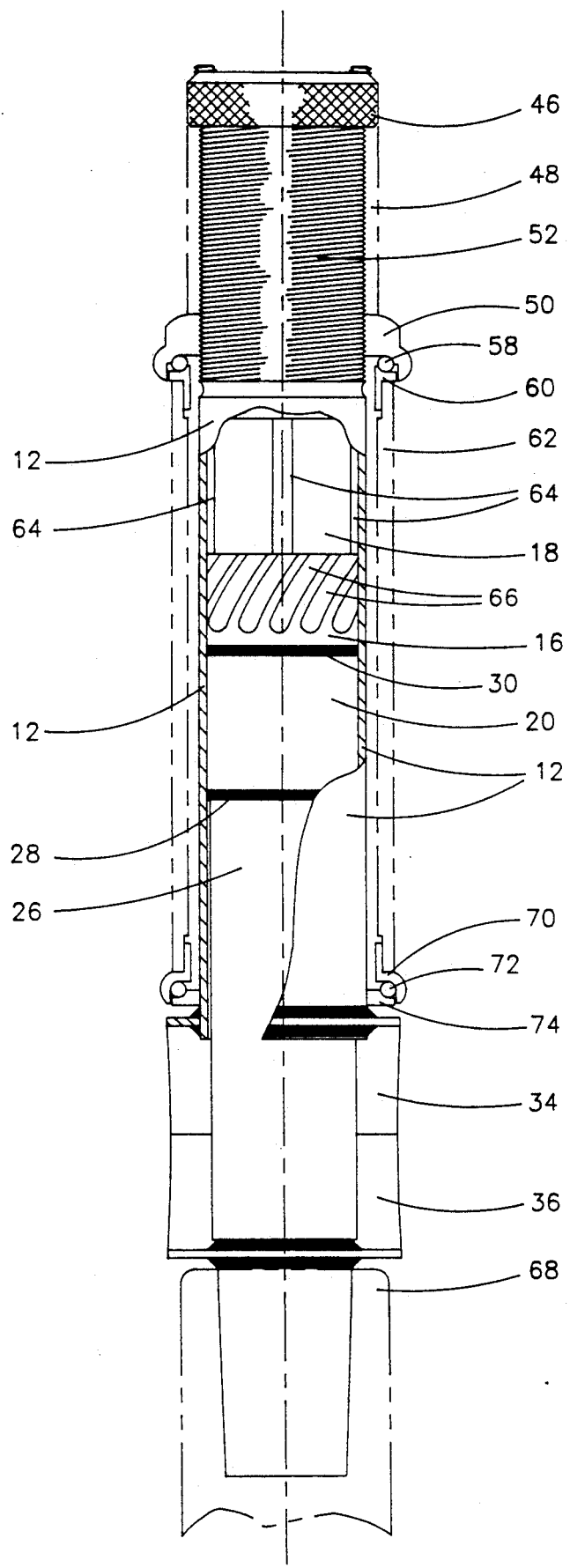
FIG. 2 is a cutaway view of a lightweight self-adjusting semihydraulic suspension system according to the present invention, showing an upper grooved bushing and a rubber sleeve having diagonal oil retention grooves and a portion of FIG. 2 is a sectional view along line 1—1 of FIG. 3.

As discussed before some of the oil 13 that is inside of air chamber 11 leaks past seal 24 and lubricates upper grooved bushing 18 and rubber sleeve 16. As shown in FIG. 2, this lubrication is assisted by vertical grooves 64 in upper grooved bushing 18, which allow the oil to move along upper grooved bushing 18. As the system is operated, the oil will be wiped all around the upper grooved bushing 18. It is also important that the oil be all around rubber sleeve 16. This is accomplished by having diagonal oil retention grooves 66 on rubber sleeve 16, as shown in FIG. 2. Diagonal grooves in rubber sleeve 16 are important as vertical grooves would not operate as well to spread the oil along the surface of rubber sleeve 16.

FIG. 2 also shows the placement of the lightweight self-adjusting semihydraulic suspension system 10 relative to the head tube 62, upper headset nut 50, bearing 58, upper headset inner race 60, lower headset outer race 70, bearing 72, and lower headset inner race 74, which are standard on most bicycles, and handlebar stem 48 and threaded cap 46.

FIG. 3 is a side elevational view of a front portion of a bicycle, including top tube 76, down tube 78, and handle bar stem extension 80, showing the location of the lightweight self-adjusting semihydraulic suspension system according to the present invention within the bicycle head tube and showing upper drive flexure 34 and lower drive flexure 36 connecting the tubular fork stem and the steerer tube at flexure connection 82. FIG. 3a is a perspective view of the upper drive flexure 34 connected to the steerer tube 12 and lower drive flexure 36 connected to the tubular fork stem 14 and flexure bolts 84, which connect upper drive flexure 34 and lower drive flexure 36 at flexure connection 82.

Figure 4:
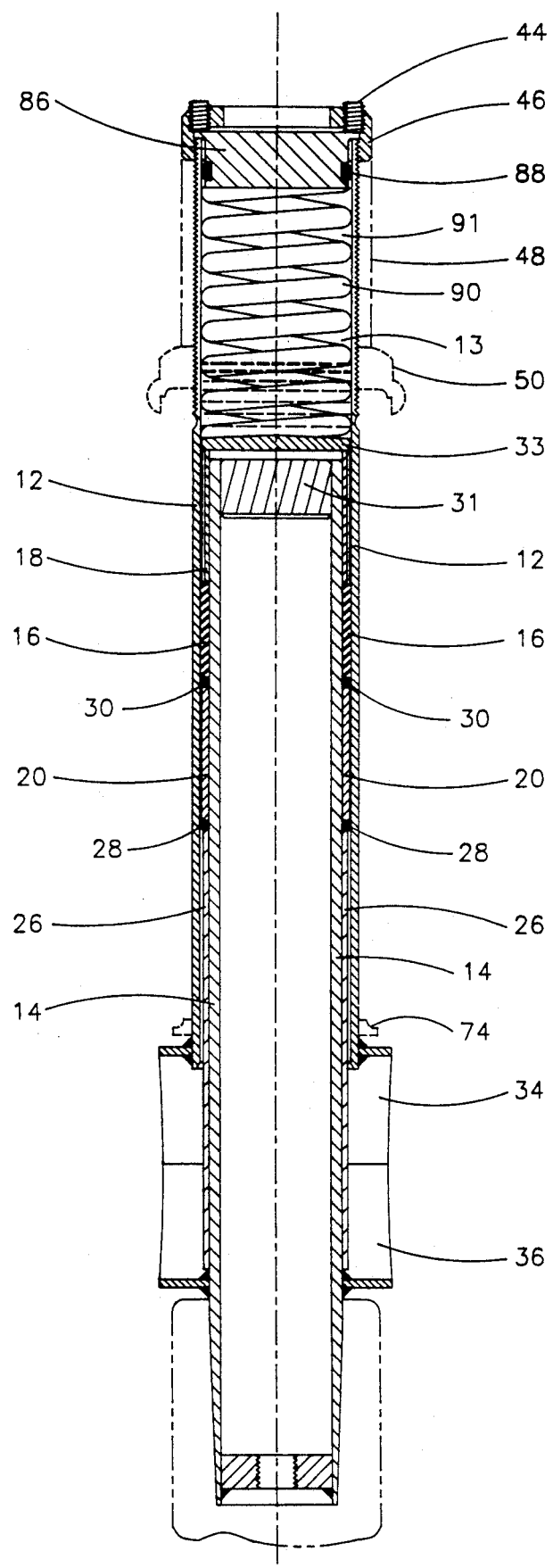
FIG. 4 is sectional view similar to that along line 1—1 of FIG. 3 of a lightweight self adjusting semihydraulic suspension system according to the present invention, having a spring.

FIG. 4 is a preferred embodiment showing the use of a spring 90 instead of an air piston spring. The spring bears upon washer 33, which in turn bears upon upper grooved bushing 18. In this embodiment the spring 90 and the washer 33 functionally replace the air chamber 11 and piston 22. The rest of the operation of the lightweight self-adjusting semihydraulic suspension system 10 is the same as described above. The upper grooved bushing 18, rubber sleeve 16, lower bushing 20, and spacer 26 are all present and operate in the same manner. Also upper drive flexure 34 and lower drive flexure 36 operate the same as before. The spring 90 is inside of the space inside of the top of steerer tube 12 enclosed by handlebar stem 48, which is called spring chamber 91 herein. Again to provide the viscous feel of a hydraulic shock absorber and to lubricate all internal parts, spring chamber 91 is partially filled with oil 13. Plug 86 and seal 88 keep the oil from leaking from the top of steerer tube 12. The oil 13 is used to lubricate upper grooved bushing 18 and rubber sleeve 16 and passes along grooves 64 in upper grooved bushing 18 and diagonal oil retention grooves 66 in rubber sleeve 16 and then is stopped by seal 30 from passing further. The top of tubular fork stem 14 is sealed by plug 31.

In the embodiment of FIG. 4 the force of the spring is determined by the selection of a spring having an appropriate spring rate, which is a measure of the stiffness of the spring. A variable spring rate could be obtained with a single spring wound so as to provide variable pitch.

Figure 5:
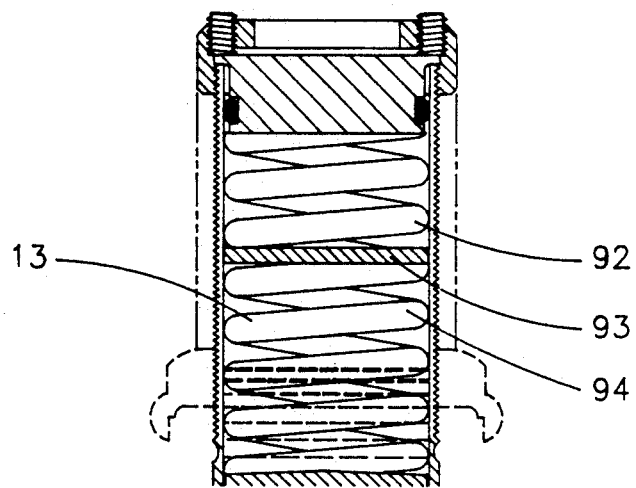
FIG. 5 is a sectional view along a portion similar to that of line 1—1 of FIG. 3 of an alternate spring arrangement having serially arranged springs.

In another preferred embodiment two springs in series are used instead of only one spring, as shown in FIG. 5, which shows first serial spring 92 and second serial spring 94 separated by washer 93. The two springs can have differing spring rates, so that the less stiff spring will take the shock of small bumps with the more stiff spring being called into action when the less stiff spring is compressed near its limit.

Figure 6:
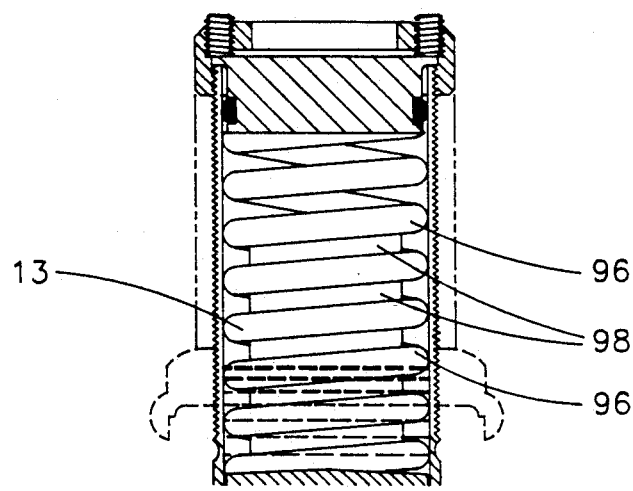
FIG. 6 is a sectional view along a portion similar to that of line 1—1 of FIG. 3 of another alternate spring arrangement having concentrically arranged springs.

Another preferred embodiment is to have two concentric springs, with one shorter than the other, as shown in FIG. 6, which shows second concentric spring 98 concentric with and inside of first concentric spring 96. The longer first concentric spring 96 would take the initial shock with the shorter second concentric spring 98 being active once first concentric spring 96 is compressed to be the same length as second concentric spring 98. The spring rates of the concentric springs would be chosen for a smooth ride.

It is thought that the apparatus and method for the present invention and many of its attendant advantages will be understood from the foregoing description and it will be apparent that various changes may be made in the form, construction, and arrangement of the parts thereof without departing from the spirit and scope of the invention or sacrificing all of its material advantages, the form hereinbefore described being merely a preferred or exemplary embodiment thereof.

I claim:

1. A self-adjusting semihydraulic suspension system comprising:
   a steerer tube;
   a tubular fork stem slidably mounted in said steerer tube;
   an upper drive flexure coupled to said steerer tube;
   a lower drive flexure coupled to said tubular fork stem and coupled to said upper drive flexure;
   a spring chamber within said steerer tube partially filled with oil;
   a spring mounted within said spring chamber;
   an upper bushing concentric to and slidably mounted around said tubular fork stem and between said steerer tube and said tubular fork stem and coupled to said spring;
   a lower bushing concentric to and slidably mounted around said tubular fork stem and between said steerer tube and said tubular fork stem; and
   a rubber sleeve concentric to and slidably mounted around said tubular fork stem and between said steerer tube and said tubular fork stem and between said upper bushing and said lower bushing;
   wherein said spring in said spring chamber provides a spring action and said rubber sleeve provides damping as it is compressed between said upper bushing and said lower bushing when said tubular fork stem moves in response to shocks transmitted from a wheel coupled to said tubular fork stem, and said upper drive flexure and said lower drive flexure prevent relative rotary motion between said steerer tube and said tubular fork stem.

2. The self-adjusting semihydraulic suspension system of claims 1 further comprising:
   grooves on said upper bushing for lubricating said upper bushing and for passing the oil along said upper bushing; and
   diagonal oil retention grooves on said rubber sleeve for lubricating said rubber sleeve.

3. The self-adjusting semihydraulic suspension system of claim 2 wherein:
   said upper drive flexure is rigidly attached at one end to said steerer tube;
   said lower drive flexure is rigidly attached at one end to said tubular fork stem;
   an opposite end of said upper drive flexure is rigidly attached to an opposite end of said lower drive flexure;
   wherein steering forces are rigidly transferred from said steerer tube to said upper drive flexure and said tubular fork stem via said lower drive flexure; and
   wherein said upper drive flexure and said lower drive flexure permit said tubular fork stem to slidably move within said steerer tube.

4. The self-adjusting semihydraulic suspension system of claim 3 wherein said spring comprises:
   a variable rate spring.

5. The self-adjusting semihydraulic suspension system of claim 3 wherein said spring comprises:
   a first spring having a first spring rate; and
   a second spring serially coupled to said first spring and having a second spring rate.

6. The self-adjusting semihydraulic suspension system of claim 3 wherein said spring comprises:
   a first spring having a first spring rate; and
   a second spring concentric with said first spring wherein said second spring is shorter in length than said first spring.

7. A method of providing a self-adjusting semihydraulic suspension system comprising the steps of:
   slidably mounting a tubular fork stem in a steerer tube;
   coupling an upper drive flexure to said steerer tube;
   coupling a lower drive flexure to said tubular fork stem and to said upper drive flexure;
   providing a spring chamber within said steerer tube;
   partially filling said spring chamber within said steerer tube with oil;
   mounting a spring within said spring chamber;
   slidably mounting an upper bushing concentric to and around said tubular fork stem and between said steerer tube and said tubular fork stem and coupled to said spring;

slidably mounting a lower bushing concentric to and around said tubular fork stem and between said steerer tube and said tubular fork stem; and slidably mounting a rubber sleeve concentric to and around said tubular fork stem and between said steerer tube and said tubular fork stem and between said upper bushing and said lower bushing so that said spring in said spring chamber provides a spring action and said rubber sleeve provides damping as it is compressed between said upper bushing and said lower bushing when said tubular fork stem moves in response to shocks transmitted from a wheel coupled to said tubular fork stem, and said upper drive flexure and said lower drive flexure prevent relative rotary motion between said steerer tube and said tubular fork stem.

8. The method of providing a self-adjusting semihydraulic suspension system of claim 7 further comprising the steps of:

providing grooves on said upper bushing for lubricating said upper bushing and for passing the oil along said upper bushing; and providing diagonal oil retention grooves on said rubber sleeve for lubricating said rubber sleeve so that said rubber sleeve with said diagonal oil retention grooves lubricated with the oil provides for the damping.

9. The method of providing a self-adjusting semihydraulic suspension system of claim 8 further comprising the steps of:

rigidly attaching one end of said upper drive flexure to said steerer tube;

rigidly attaching one end of said lower drive flexure to said tubular fork stem; and rigidly attaching an opposite end of said upper drive flexure to an opposite end of said lower drive flexure so that steering forces are rigidly transferred from said steerer tube to said upper drive flexure and said tubular fork stem via said lower drive flexure and so that said upper drive flexure and said lower drive flexure permit said tubular fork stem to slidably move within said steerer tube.

10. The method of providing the self-adjusting semihydraulic suspension system of claim 9 wherein the step of providing a spring comprises the step of:

providing a variable rate spring.

11. The method of providing the self-adjusting semihydraulic suspension system of claim 9 wherein the step of providing a spring comprises the steps of:

providing a first spring having a first spring rate; and providing a second spring serially coupled to said first spring and having a second spring rate.

12. The method of providing the self-adjusting semihydraulic suspension system of claim 9 wherein the step of providing a spring comprises the steps of:

providing a first spring having a first spring rate; and providing a second spring concentric with said first spring wherein said second spring is shorter in length than said first spring.

* * * * *